(12) United States Patent
Masters

(10) Patent No.: US 9,049,287 B2
(45) Date of Patent: Jun. 2, 2015

(54) METHOD AND SYSTEM FOR RESOLVING PHONE NUMBERS FOR FILTERING VOICE CALLS

(75) Inventor: Jonathan Masters, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 307 days.

(21) Appl. No.: 13/149,748

(22) Filed: May 31, 2011

(65) Prior Publication Data

US 2012/0307993 A1 Dec. 6, 2012

(51) Int. Cl.
*H04M 3/42* (2006.01)
*H04M 3/436* (2006.01)

(52) U.S. Cl.
CPC .......... *H04M 3/42059* (2013.01); *H04M 3/436* (2013.01)

(58) Field of Classification Search
USPC ..................................................... 379/201.01
See application file for complete search history.

(56) References Cited

U.S. PATENT DOCUMENTS

| | | | | |
|---|---|---|---|---|
| 5,832,072 A * | 11/1998 | Rozenblit | ..................... | 379/246 |
| 5,999,611 A * | 12/1999 | Tatchell et al. | .......... | 379/211.02 |
| 6,160,877 A * | 12/2000 | Tatchell et al. | ............... | 379/197 |
| 6,298,122 B1 * | 10/2001 | Horne | ........................ | 379/93.09 |
| 8,503,636 B1 * | 8/2013 | McCorkendale | ............. | 379/134 |
| 2004/0001580 A1 * | 1/2004 | Mason | ..................... | 379/207.04 |

* cited by examiner

*Primary Examiner* — Duc Nguyen
*Assistant Examiner* — Assad Mohammed
(74) *Attorney, Agent, or Firm* — Lowenstein Sandler LLP

(57) ABSTRACT

A private branch exchange (PBX) server determines a caller identification (ID) of a voice call received from a first phone system attempting to reach a second phone system. The PBX server transmits a request to a remote phone number resolving server for categorizing the caller ID. In response to a response received from the remote phone number resolving server indicating one or more categories associated with the caller ID, the PBX server processes the voice call based on the one or more categories.

21 Claims, 6 Drawing Sheets

| Categories 201 | Actions 202 |
|---|---|
| SPAM | Drop |
| Telemarketer | Play preconfigured message |
| Personal | Dispatch |
| ... | ... |

FIG. 2

| Phone Numbers 301 | Categories 302 | Confident Scores 303 |
|---|---|---|
| 123456789 | SPAM | 10 |
| 343124541 | Telemarketer | 7 |
| ⋮ | ⋮ | ⋮ |

FIG. 3

METHOD AND SYSTEM FOR RESOLVING PHONE NUMBERS FOR FILTERING VOICE CALLS

TECHNICAL FIELD

Embodiments of the present invention relate generally to telecommunications. More particularly, embodiments of the invention relate to phone number resolving techniques in voice phone calls.

BACKGROUND

Technological advances have significantly changed telecommunications. Particularly, telephone capabilities have changed dramatically over the last few years. A feature that has become readily available in both standard and cellular phones is caller identification (caller ID). Caller ID is a function of the telephone that allows a call recipient of the telephone to view information regarding the incoming call. Typically, a display associated with a call recipient's telephone, either integrated into the telephone itself or as a part of specifically tailored hardware (e.g., as an external display box) may display a telephone number and/or a name associated with an incoming call.

Depending on the characteristics of the individual system, caller ID may be utilized in certain call filtering applications. For example, based on caller ID data, a user can program a phone such as a voice over Internet protocol (VoIP) phone to block unwanted callers, automatically hang up, or play certain greeting messages. However, a user or an administrator has to configure the local phone system or the associated private branch exchange (PBX) system and specific known phone numbers have to be programmed to be associated with the call routing rules. If an incoming call is received with an unknown phone number, the call filtering operations may not be effective.

BRIEF DESCRIPTION OF THE DRAWINGS

The present invention is illustrated by way of example and not limitation in the figures of the accompanying drawings in which like references indicate similar elements.

FIG. 2 is a block diagram illustrating an example of data structure storing call processing rules according to one embodiment of the invention.

FIG. 3 is a block diagram illustrating an example of data structure for categorizing phone numbers according to one embodiment of the invention.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, a centralized server is utilized as a phone number resolving server that maintains a database having phone numbers categorized into a variety of categories or profiles, for example, indicating whether a particular phone number is a SPAM caller or telemarketer, etc. The server is configured to provide a lookup service for a variety of clients to determine whether a particular phone number is associated with a particular category. In one embodiment, a client, which may be an IP PBX server for VoIP, transmits a request to the phone number resolving server by providing a phone number of an incoming call (e.g., a caller ID) to determine the category of the phone number. In response, the phone number resolving server accesses the database and returns information to the client indicating one or more categories associated with the phone number. Such information can be utilized by the client to process the incoming call, such as, for example, routing the call to the intended recipient, playing a particular message, or dropping the call entirely, etc.

In one embodiment, the phone number resolving server also provides a user interface, such as a Web portal, to allow a user to register or designate a phone number under a particular category. For example, a user can "report" a particular phone number as a SPAM phone number via the user interface. As a result, when an incoming call is received at a PBX server with a phone number unknown to the recipient, the PBX server can invoke such a service from the phone number resolving server for categorizing the unknown phone number. Based on the information obtained from the phone number resolving server, the PBX server can properly process the incoming call.

Figure 1:
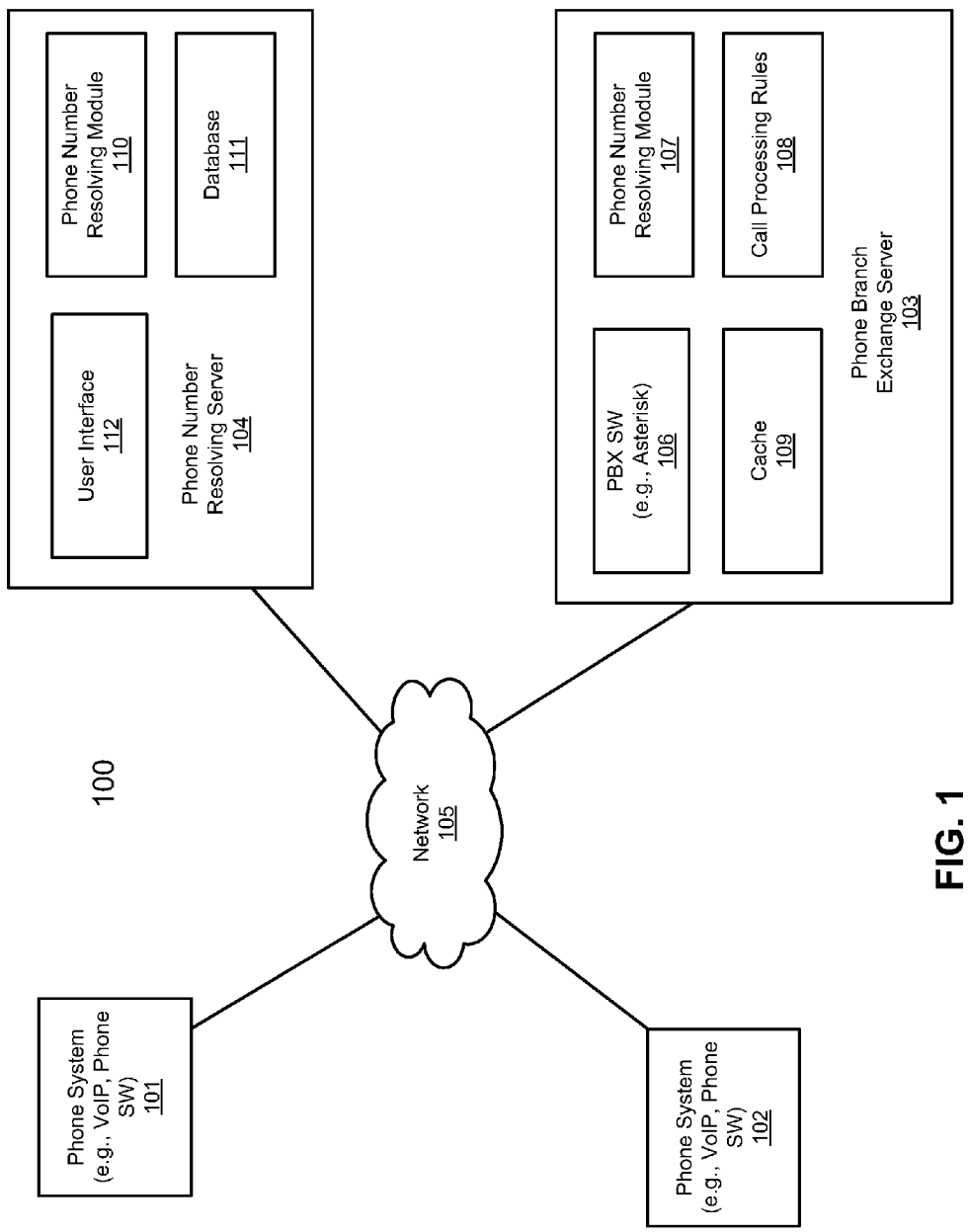
FIG. 1 is a block diagram illustrating a system for processing voice calls according to one embodiment of the invention.

FIG. 1 is a block diagram illustrating a system for processing voice calls according to one embodiment of the invention. Referring to FIG. 1, system 100 includes, but is not limited to, one or more phone systems 101-102 communicatively coupled to network 105 and a PBX server 103 that provides PBX services to phone system 101 and/or phone system 102. In one embodiment, phone systems 101-102 may be VoIP ready phones that can communicate with each other over a packet network such as the Internet. For example, any one of phones 101-102 may be an IP phone that has VoIP processing hardware and software integrated therein, including a network connector to couple the phone to PBX server 103 over network 105. Alternatively, any one of phone systems 101-102 may be a traditional analog phone coupled to a data processing system such as a personal computer via an adapter, where the data processing system has the capability of communicating with PBX server 103 over network 105. In another example, phones 101-102 may be connected over a traditional, analog, public switched telephone network (PSTN) and the PSTN may perform query to the database to determine the phone numbers for one or more of the phones 101-102 (e.g., neither of the phones 101 and 102 are VoIP phones, and the PSTN has the ability to query the database). Furthermore, any one of phones 101-102 may be a phone application, such as Skype™ software, running within a computing device, which may be any kind of computing devices such as a desktop, laptop, mobile phone, tablet, etc.

PBX server 103 may be a VoIP capable PBX system (also referred to herein as an IP PBX server) having most or all of the functionalities of a traditional PBX system. Typically, an IP PBX server sits as a node on an enterprise's computer network (e.g., local area network or LAN), and each of the enterprise telephone stations in turn sits as a respective node on the computer network as well. Signaling and bearer communications between the telephone stations and the IP PBX server then traverse the computer network as IP communications. Like a conventional PBX server, an IP PBX server may be coupled to a telephone company central office, so that the enterprise telephone stations can place and receive calls via a public switched telephone network (PSTN).

In one embodiment, PBX server 103 includes PBX software 106 that handles all of the IP PBX functionalities. In one embodiment, PBX software 106 is developed based on Asterisk™ PBX software. Asterisk is a software implementation of a telephone PBX Like any PBX, it allows attached telephones to make calls to one another, and to connect to other telephone services including the PSTN and VoIP services. The Asterisk™ software includes many features available in proprietary PBX systems: voice mail, conference calling, interactive voice response (e.g., phone menus), and automatic call distribution, etc.

Referring back to FIG. 1, in one embodiment, PBX server 103 further includes a phone number resolving module 107 and a database having call processing rules 108. Call processing rules 108 include rules used by PBX software 106 to determine how a call is to be processed. Phone number resolving module 107 is configured to contact phone number resolving server 104 to resolve a phone number that is unknown to PBX software 106 or has not been configured in call processing rules 108.

When a call is received at PBX server 103, for example, from a remote phone system 101 attempting to reach a local phone system 102 that is associated with PBX server 103, PBX software 106 is configured to determine a caller ID from the call and process the call based on call processing rules 108. For example, PBX software 106 may dispatch the call to phone system 102 as a recipient if the caller ID is known and the corresponding call processing rules permit. Alternatively, PBX software 106 may play a preconfigured voice message, forward the call to a voicemail, or drop the call entirely, dependent upon the specific configuration of call processing rules 108.

According to one embodiment, when a call is received with an unknown caller ID, phone number resolving module 107 is configured to transmit a request having the unknown caller ID to phone number resolving server 104 to categorize the unknown caller ID. In response, phone number resolving module 110 of server 104 is configured to search within database 111 to determine one or more categories associated with the caller ID in question, such as, for example, SPAM, telemarketer, etc. The information concerning the one or more categories is then transmitted back to PBX server 103. Additional information concerning the caller ID may also be transmitted. For example, Local Number Porting Administration (LPNA) information (which may comprise translation numbers used to map an original caller or a destination number onto an end-user) may be transmitted. In another example, headers from Signaling System 7 packets and/or Session Initiation Protocol (SIP) packets (which may be used to authenticate/verify call records) may be transmitted. Based on the one or more categories of the caller ID received from phone number resolving server 104, PBX software 106 is configured to process the call according to processing rules 108. Each user may be associated with a separate or different set of call processing rules. In one embodiment, an authentication mechanism may also be included to verify authenticity of the call records. The authentication mechanism may query existing databases, such as those provided by the LPNA, to translate numbers into known network addresses. The network addresses may be verified by looking up the network address in the database.

FIG. 2 shows an example of call processing rules 108 based on a variety of categories according to one embodiment, which may be configurable by a user or an administrator. Referring to FIG. 2, each of the categories 201 is associated with one or more actions 202 for routing or dispatching a call that has been categorized as one of the categories 201. For example, if a call has been categorized as a SPAM caller, according to the processing rules as shown in FIG. 2 associated with a call recipient, the call will be dropped. If the caller has been categorized as a telemarketer, a predetermined message is played. If the caller is someone known to the recipient, the call will be dispatched to the recipient.

In one embodiment, database 111 of phone number resolving server 104 is configured to store phone numbers, where each phone number is associated with one or more particular categories. The phone numbers may be registered or entered by a variety of users via user interface 112, which may be a Web page, a network connection, a texting or email interface, etc. The categories may be created or managed by users or an administrator of server 104. In addition, based on the user interaction with server 104, the designation of a category of a phone number may be rated or assigned a confidence score representing the likelihood that a particular phone number is associated with a particular category. For example, if a particular phone number has been designated to a particular category by a large number of users (e.g., a predetermined threshold), its confidence score may be calculated higher. As a result, such rating takes an advantage of opinions from users in a large community, which may fairly represent the accuracy of the rating.

FIG. 3 shows an example of database entries of database 111 according to one embodiment. Referring to FIG. 3, database 111 in this example includes many entries, each corresponding to a specific phone number. Each of phone numbers 301 is associated with one or more categories 302. In this example, each phone number is associated with a particular category. There may be multiple entries corresponding to the same phone number, but each corresponding to a different category. In addition, each combination of a phone number and category is associated with a confidence score representing the likelihood that the corresponding phone number belongs to the corresponding category. In one embodiment, the confidence score is calculated based on how many users who have ranked the phone number in the associated categories. For example, whenever a user rates a particular phone number to be associated with a particular category, the counter for the corresponding confidence score will be incremented.

According to one embodiment, phone number resolving server 104 may be implemented as part of or an extension of a domain name service or (DNS) server, where PBX server 103 communicates with server 104 using DNS compatible communications protocols. DNS is a hierarchical naming system built on a distributed database for computers, services, or any resource connected to the Internet or a private network. It associates various information with domain names assigned to each of the participating entities. Most importantly, it translates domain names meaningful to humans into the numerical identifiers associated with networking equipment for the purpose of locating and addressing these devices worldwide.

In this embodiment, in addition to looking up a specific domain name for an IP address, server 104 is configured to look up a phone number for the purpose of categorizing the phone number. For example, in order to perform a regular DNS lookup service, a client of a DNS server may submit a DNS query having an IP address in a common form, such as "www.myservice.com." However, if a client wishes to perform a lookup on a phone number, it may submit a DNS query in a different format, such as "123456789.spam.myservice.com," where "123456789" is the phone number in question. As a result, the DNS server can perform lookup services properly. Other formats may also be utilized.

According to another embodiment, PBX server 103 further includes cache 109 to cache the information received from server 104, such that subsequent calls with the same phone number can be resolved locally using the information from cache 109 without having to access server 104 again. In one embodiment, the cached information may remain valid for a predetermined period of time. After the period of time lapses, the cached information becomes invalid and any subsequent call with the same phone number would have to invoke another phone number lookup service again from server 104.

According to a further embodiment, phone system 102 includes a user interface such as a programmable button to allow a user to designate a phone number into one or more categories in database 111 of server 104. For example, when phone system 102 receives a call dispatched by PBX server 103 based on call processing rules and/or information received from phone number resolving server 104, the user may decide that the caller should belong to at least one of the categories maintained in database 111 of server 104. The user may then activate the interface of phone system 102 to update a local call filtering database (not shown) for filtering purpose. In this embodiment, a user would build a self-maintaining database of known callers that could work in combination with automated rules (e.g., rules 108), similar to SPAM email processes. Alternatively, the user interface of phone system 102 may communicate with user interface 112 of server 104 to associate the caller ID with one or more categories stored in database 111.

Note that server 104 may be implemented as a worldwide publicly accessible server. Using at least some of the techniques set forth above, a public database of known callers can be built, where the database can be used by anyone for filtering call purposes. For example, one can easily assign rules for certain kinds of marketing calls, define the time of day he/she is willing to receive the calls, standardized messages, and define thresholds beyond which numbers are added to a filter. The lookup services provided by server 104 can be implemented as free community-based services or alternatively as subscription-based services.

Figure 4:
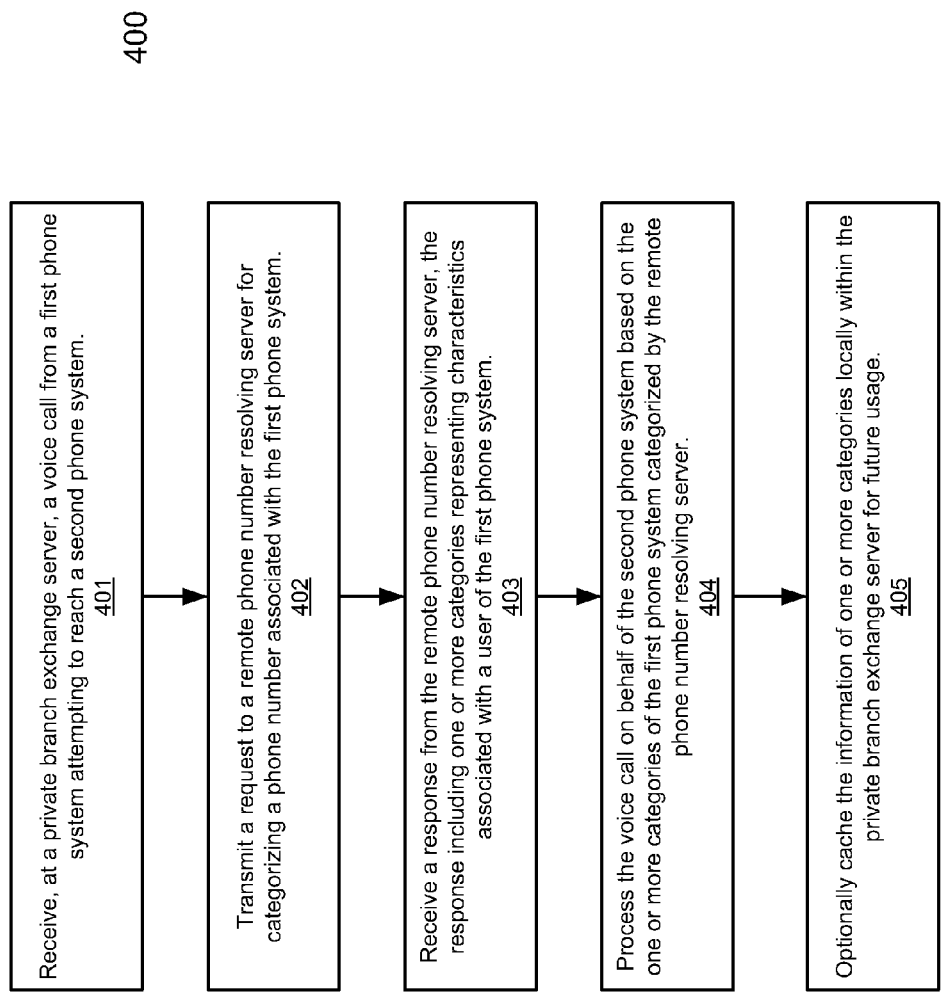
FIG. 4 is a flow diagram illustrating a method of processing incoming voice calls according to one embodiment of the invention.

FIG. 4 is a flow diagram illustrating a method of processing incoming voice calls according to one embodiment of the invention. For example, method 400 may be performed by PBX server 103 of FIG. 1. Referring to FIG. 4, at block 401, a voice call is received at a PBX server from a first phone system attempting to reach a second phone system. Such a call may be a VoIP call. If the caller's phone number is unknown, at block 402, PBX server transmits a request to a remote phone number resolving server for categorizing the phone number of the first phone system. In this situation, the PBX server may extract a caller ID from the voice call and transmit the caller ID to the remote server. The remote server may be implemented as part of a DNS server and the PBX server may communicate with the remote server using DNS compatible protocols. At block 403, a response is received from the remote phone number resolving server. The response includes information indicating one or more categories associated with the caller ID. At block 404, the voice call is processed on behalf of the second phone system based on the one or more categories of the first phone system. In one embodiment, processing logic examines the call processing rules of the second phone system (e.g., call processing rules as shown in FIG. 2) based on the categories of the first phone system. For example, referring to FIG. 2, if it is determined that the first phone system is associated with a SPAM category, the call may be dropped. At block 405, the information received from the remote phone number resolving server may be optionally cached in a local cache of the PBX server for future usage without having to contact the remote server again. The cached information may remain valid for a period of time.

Figure 5:
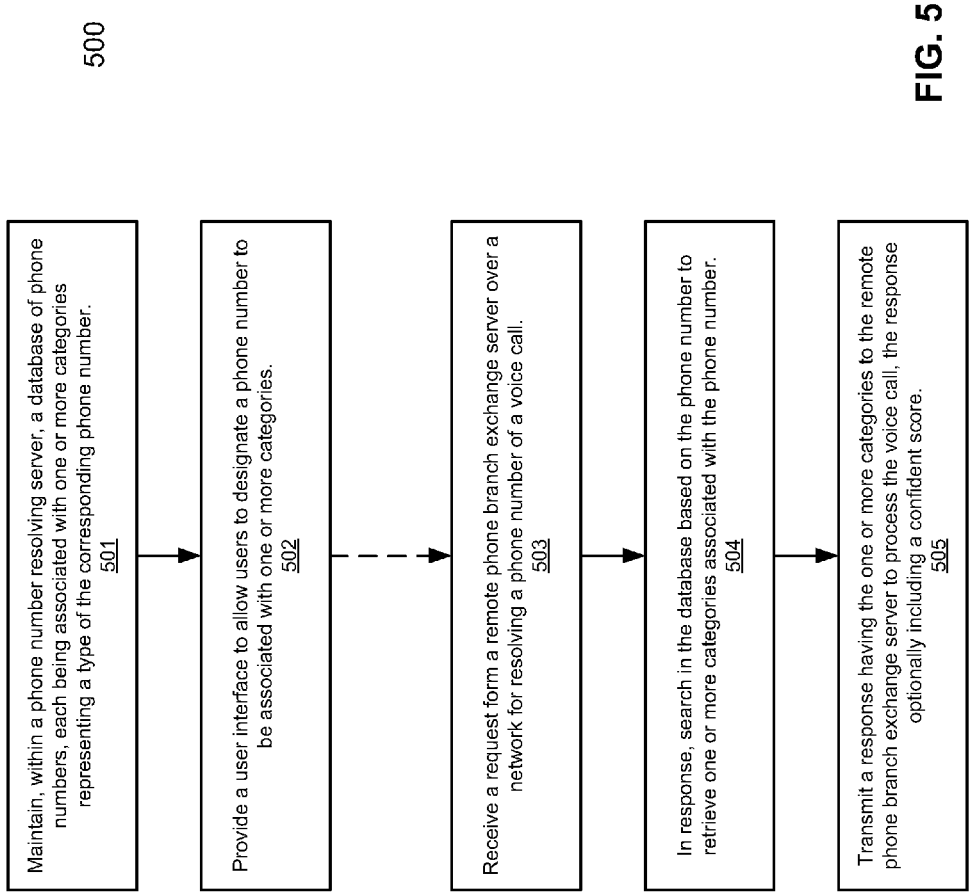
FIG. 5 is a flow diagram illustrating a method of resolving phone numbers of voice calls according to one embodiment of the invention.

FIG. 5 is a flow diagram illustrating a method of resolving phone numbers of voice calls according to one embodiment of the invention. For example, method 500 may be performed by phone number resolving server 104 of FIG. 1. Referring to FIG. 5, at block 501, a database is maintained storing phone numbers, where each phone number is associated with one or more categories, such as SPAM, telemarketer, etc. In addition, at block 502, a user interface (e.g., Web page, network connection, email/texting mechanisms) is provided to allow a variety of users to register phone numbers to be associated with one or more categories. In one embodiment, each phone number may also be associated with a confidence score representing the likelihood that a particular phone number is associated with a particular category. In one embodiment, a confidence score associated with a particular category of a phone number is incremented whenever a user rates the phone number belonging to the particular category. Thus, more users rate the particular category, the higher confidence score will be. Subsequently at block 503, a request is received from a remote PBX server for resolving a phone number of a voice call (e.g., caller ID). In response, at block 504, a search is conducted in the database to locate an entry matching the phone number being requested and to retrieve one or more categories that are associated with the phone number. At block 505, a response is transmitted to the remote PBX system to process the voice call. The response includes the one or more categories associated with the phone number. The response also optionally includes a confidence score.

Figure 6:
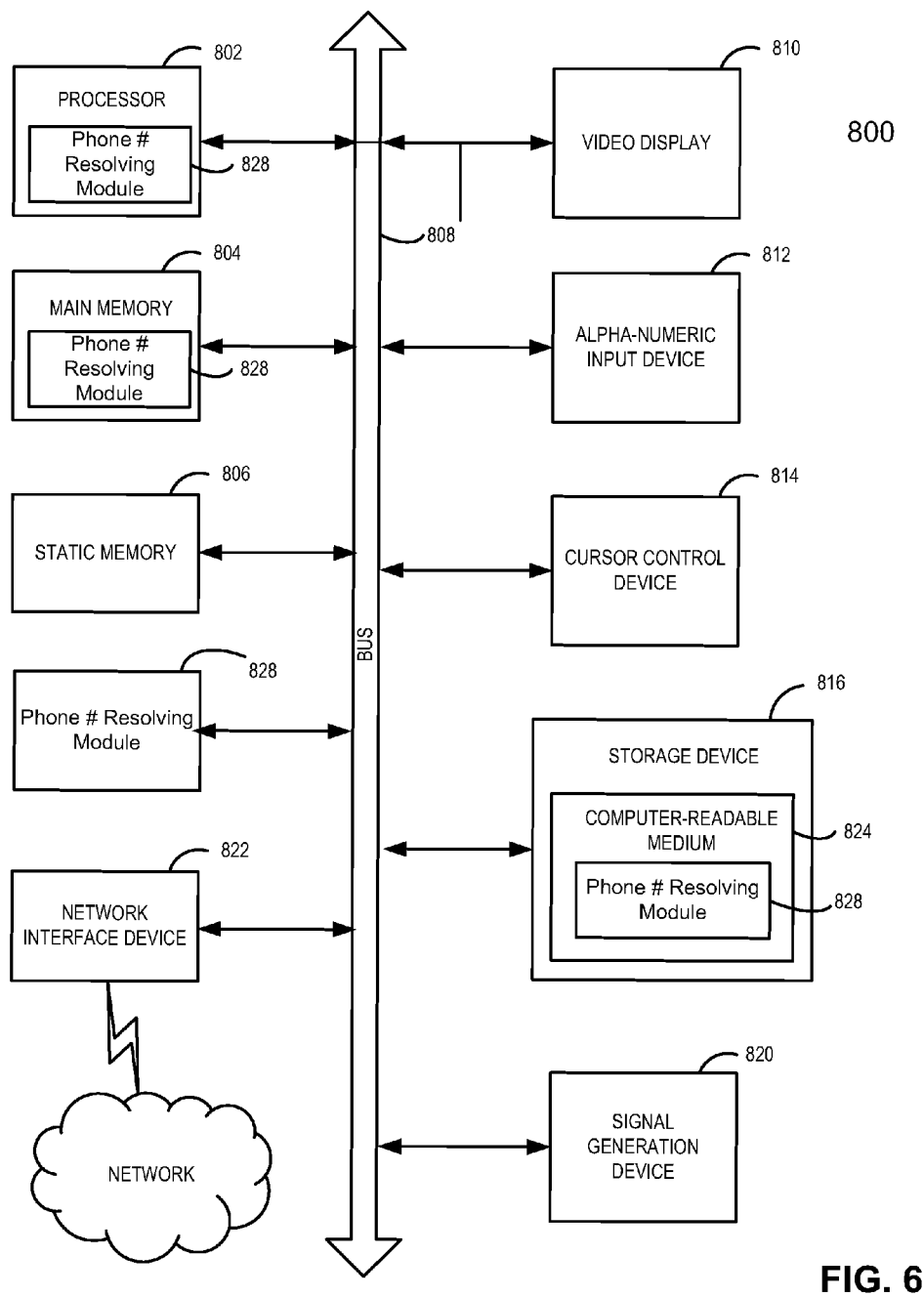
FIG. 6 illustrates a data processing system which may be used with an embodiment of the invention.

FIG. 6 illustrates a data processing system which may be used with an embodiment of the invention. For example, system 800 may represent a PBX server or a phone number resolving server as described above. Referring to FIG. 6, system 800 may present a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 828 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., module 828) embodying any one or more of the methodologies or functions described herein. The module 828 may also reside, completely or at least partially, within the main memory 804 and/or within the processor 802 during execution thereof by the computer system 800, the main memory 804 and the processor 802 also constituting machine-accessible storage media. The module 828 may further be transmitted or received over a network via the network interface device 822.

The computer-readable storage medium 824 may also be used to store the desktop 101 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for filtering voice calls, comprising:

determining, at a private branch exchange (PBX) server, a caller identification (ID) of a voice call received from a first phone system attempting to reach a second phone system, the caller ID being unknown to a user of the second phone system;

transmitting a request having the caller ID from the PBX server to a remote phone number resolving server for categorizing the caller ID;

receiving a response from the remote phone number resolving server, the response indicating one or more categories associated with the caller ID and one or more confidence scores representing a likelihood that the caller ID belongs to a respective category; and determining, by a processing device of the PBX server, how to handle the voice call in view of the one or more categories and the one or more confidence scores.

2. The method of claim 1, wherein in response to the request, the remote phone number resolving server is configured to perform a search in a database containing a plurality of phone numbers, each being associated with at least one category representing types of users of the phone numbers, to retrieve the one or more categories associated with the caller ID.

3. The method of claim 2, wherein the remote phone number resolving server is configured to provide a user interface to allow a user to register a particular phone number to be associated with a particular category.

4. The method of claim 1, wherein each confidence score represents a likelihood that the caller ID belongs to a respective category based on user interaction with the caller ID at the phone number resolving server.

5. The method of claim 1, wherein determining how to handle the voice call in view of the one or more categories and the one or more confidence scores comprises:
 accessing a rule database within the PBX server to determine one or more actions based on the one or more categories; and
 performing the determined one or more actions, including one of routing the voice call to the second phone system, playing a predetermined voice message, playing a predetermined ring tone, or terminating the voice call.

6. The method of claim 1, further comprising caching information of one or more categories in a local cache of the PBX server for processing a subsequent voice call with the same caller ID without accessing the phone number resolving server again.

7. The method of claim 6, wherein the information of one or more categories remains valid in the local cache for a predetermined period of time only.

8. A non-transitory computer-readable storage medium having computer instructions stored therein, which when executed by a processing device, cause the processing device to perform operations comprising:
 determining, at a private branch exchange (PBX) server, a caller identification (ID) of a voice call received from a first phone system attempting to reach a second phone system, the caller ID being unknown to a user of the second phone system;
 transmitting a request having the caller ID from the PBX server to a remote phone number resolving server for categorizing the caller ID;
 receiving a response from the remote phone number resolving server, the response indicating one or more categories associated with the caller ID and one or more confidence scores representing a likelihood that the caller ID belongs to a respective category; and
 determining, by the processing device of the PBX server, how to handle the voice call in view of the one or more categories and the one or more confidence scores.

9. The computer-readable storage medium of claim 8, wherein in response to the request, the remote phone number resolving server is configured to perform a search in a database containing a plurality of phone numbers, each being associated with at least one category representing types of users of the phone numbers, to retrieve the one or more categories associated with the caller ID.

10. The computer-readable storage medium of claim 9, wherein the remote phone number resolving server is configured to provide a user interface to allow a user to register a particular phone number to be associated with a particular category.

11. The computer-readable storage medium of claim 8, wherein each confidence score represents a likelihood that the caller ID belongs to a respective category based on user interaction with the caller ID at the phone number resolving server.

12. The computer-readable storage medium of claim 8, wherein determining how to handle the voice call in view of the one or more categories and the one or more confidence scores comprises:
 accessing a rule database within the PBX server to determine one or more actions based on the one or more categories; and
 performing the determined one or more actions, including one of routing the voice call to the second phone system, playing a predetermined voice message, playing a predetermined ring tone, or terminating the voice call.

13. The computer-readable storage medium of claim 8, wherein the method further comprises caching information of one or more categories in a local cache of the PBX server for processing a subsequent voice call with the same caller ID without having to accessing the phone number resolving server again.

14. The computer-readable storage medium of claim 13, wherein the information of one or more categories remains valid in the local cache for a predetermined period of time only.

15. A data processing system, comprising:
 a private branch exchange (PBX) module to determine a caller identification (ID) of a voice call received from a first phone system attempting to reach a second phone system, the caller ID being unknown to a user of the second phone system;
 and
 a phone number resolving module coupled to the PBX module to transmit a request having the caller ID from the PBX server to a remote phone number resolving server for categorizing the caller ID, to receive a response from the remote phone number resolving server, the response indicating one or more categories associated with the caller ID and one or more confidence scores representing a likelihood that the caller ID belongs to a respective category, and to determine how to handle the voice call in view of the one or more categories and the one or more confidence scores.

16. The system of claim 15, wherein the PBX module is configured to access a rule database within the PBX server to determine one or more actions based on the one or more categories, and
 perform the determined one or more actions, including one of routing the voice call to the second phone system, playing a predetermined voice message, playing a predetermined ring tone, or terminating the voice call.

17. The system of claim 15, further comprising a cache to cache information of one or more categories for processing a subsequent voice call with the same caller ID without having to accessing the phone number resolving server again.

18. The system of claim 17, wherein the information of one or more categories remains valid in the cache for a predetermined period of time only.

19. A computer-implemented method for resolving phone numbers, comprising:
- maintaining, within a server, a database storing a plurality of phone numbers, each being associated with one or more categories representing a type of user associated with the corresponding phone number;
- receiving a request from a remote private branch exchange (PBX) server over a network, the request including a caller identification (ID) of a voice call received at the remote PBX server from a first phone system to reach a second phone system, the caller ID being unknown to a user of the second phone system;
- in response to the request, retrieving from the database one or more categories associated with the caller ID; and
- transmitting a response to the remote PBX server, the response having the one or more categories associated with the caller ID and one or more confidence scores representing a likelihood that the caller ID belongs to a respective category, the one or more categories and the one or more confidence scores to be utilized by the remote PBX server to process the voice call.

20. The method of claim 19, further comprising providing a user interface to allow a user to register a particular phone number to be associated with a particular category.

21. The method of claim 20, further comprising maintaining a confidence score for each of the phone numbers within the database representing a likelihood that the corresponding phone number belongs to a particular category based on user interaction.

* * * * *